(12) United States Patent
Senoo

(10) Patent No.: US 7,056,457 B2
(45) Date of Patent: Jun. 6, 2006

(54) CUSHION BODY OF SEAT CUSHION AND METHOD OF MANUFACTURING THE CUSHION BODY

(76) Inventor: Yasumasa Senoo, 4-5-43 Kojima-Shimonocho, Kurashiki-shi, Okayama 711-0906 (JP)

( * ) Notice: Subject to any disclaimer, the term of this patent is extended or adjusted under 35 U.S.C. 154(b) by 434 days.

(21) Appl. No.: 10/471,187

(22) PCT Filed: Jan. 6, 2003

(86) PCT No.: PCT/JP03/00013

§ 371 (c)(1),
(2), (4) Date: Sep. 9, 2003

(87) PCT Pub. No.: WO03/059803

PCT Pub. Date: Jul. 24, 2003

(65) Prior Publication Data

US 2004/0090106 A1    May 13, 2004

(30) Foreign Application Priority Data

Jan. 10, 2002    (JP) ............................. 2002-003432

(51) Int. Cl.
*B29C 44/06* (2006.01)

(52) U.S. Cl. .................... 264/46.4; 264/46.7; 264/102; 264/271.1; 425/812

(58) Field of Classification Search ............... 264/46.4, 264/46.7, 102, 271.1; 425/812
See application file for complete search history.

(56) References Cited

U.S. PATENT DOCUMENTS

| | | | | |
|---|---|---|---|---|
| 4,247,348 A | * | 1/1981 | Lischer | ......................... 156/79 |
| 4,287,143 A | * | 9/1981 | Sears et al. | ................ 264/46.8 |
| 4,558,905 A | * | 12/1985 | Natori | ...................... 297/452.6 |
| 4,718,153 A | * | 1/1988 | Armitage et al. | ............ 29/91.1 |

FOREIGN PATENT DOCUMENTS

| | | |
|---|---|---|
| JP | 62-105611 | 5/1987 |
| JP | 63-54398 | 4/1988 |
| JP | 3-41992 | 2/1991 |
| JP | 5-422 | 1/1993 |
| JP | 5-269031 | 10/1993 |
| JP | 2001-327357 | 11/2001 |

* cited by examiner

*Primary Examiner*—Allan R. Kuhns
(74) *Attorney, Agent, or Firm*—Renner Kenner Greive Bobak Taylor & Weber

(57) ABSTRACT

An object of the invention is to provide a cushion body of a seat cushion that can be easily reinforced in low cost, to provide a method for manufacturing such a cushion body and to provide an apparatus for manufacturing such a cushion body. A cushion body 10 of a seat cushion has a main part and a side part generally corresponding to a main part and a side part of the seat cushion. The cushion body 10 comprises a foamed body 11 formed in a shape generally corresponding to an outline of the cushion body 10, an air-permeable material 12 fixed to the cushion body 10 and an impregnation layer 13 that serves to reinforce a portion of the cushion body 10 where the air-permeable material 12 is fixed to the foamed body 11. The foamed body his made of cold urethane foam. The thickness of the impregnation layer 13 has a thickness that can provide a predetermined strength to reinforce a portion of the cushion body 10 where the air-permeable material 12 is fixed to the foamed body 11.

2 Claims, 3 Drawing Sheets

CUSHION BODY OF SEAT CUSHION AND METHOD OF MANUFACTURING THE CUSHION BODY

TECHNICAL FIELD

This invention relates to a technique for manufacturing a seat cushion of a bucket or bench seat installed in a vehicle such as a car, an aircraft, a ship and the like and, in particular, relates to a cushion body of such a seat cushion, a method for manufacturing the cushion body and an apparatus for manufacturing the cushion body.

BACKGROUND OF THE ART

A bucket or bench seat installed in a vehicle such as a car, an aircraft, a ship and the like has a bottom and a backrest. The bottom is provided with a cushion (hereinafter referred to as a seat cushion), and the backrest is also provided with a seat cushion. Such a seat may be provided with a reclining mechanism and/or a mechanism for jumping up the bottom. In addition, the bottom and/or the backrest may be provided with a protuberant circumference for securely supporting a user.

The seat cushion comprises a surface material (or a cushion cover) and a cushion body covered with the surface material. The cushion body has a main part and a side part generally corresponding to a main part and a side part of the seat cushion.

The cushion body comprises a foamed body formed in a shape generally corresponding to a shape of the cushion body. The foamed body is soft to give a soft feeling. The cushion body further comprises a reinforcing material fixed to the foamed body. At least one of the main part and the side part of the cushion body is reinforced with the reinforcing material, and a deformation of the seat cushion is thereby restrained to support a user securely.

The foamed body is made of a foaming (or expandable) resin. In general, a foaming urethane resin is used as the foaming resin.

The foamed body is manufactured using a foaming apparatus comprising a molding device. The molding device comprises an upper mold having an inside corresponding to a shape of a back part of the cushion body and a lower mold having an inside corresponding to a shape of the main part and the side part of the cushion body. When the molding device is damped, an inner space corresponding to an outline of the cushion body is formed inside the molding device. An undiluted solution of a foaming resin is injected into the molding device and expands to form in a shape corresponding to the outline of the cushion body. Thereby, the foamed body is manufactured.

An undiluted solution of cold urethane foam is used as the undiluted solution of the foaming resin to be injected in the molding device. The undiluted solution of cold urethane foam produces gas. The gas is trapped inside the undiluted solution while the undiluted solution of cold urethane foam expands, so that bubbles of the gas are dispersed inside the expanded cold urethane foam. A part of gas produced by the undiluted solution is not trapped inside the expanded cold urethane foam and is exhausted through a vent hole(s) provided in the upper mold of the molding device until the inner space of the molding device is completely filled with the expanded cold urethane foam. Air initially presented inside the molding device is also exhausted through the vent hole(s). Then, the foamed body can be formed in a shape precisely corresponding to the inner space defined by the insides of the upper and lower molds.

The side part and the back part of the cushion body are reinforced by use of one or more reinforcing materials. A rigid or half-rigid plate is used as the reinforcing material. In order to provide a predetermined strength of reinforcement required for the cushion body, this reinforcing material is manufactured by densely binding urethane chips using a binder. Such a reinforcing material is positioned inside the molding device and an undiluted solution of a foaming resin is then injected in the molding device. While the undiluted solution expands to form the complete foamed body, the reinforcing material is fixed to a portion of the foamed body corresponding to the side part and/or the back part of the cushion body. (The undiluted solution of a foaming resin expands and impregnates into the reinforcing material so that a thin impregnation layer is formed in an overlapped portion of the foamed body and the reinforcing material. This thin impregnation layer merely serves to fix the reinforcing material to the foamed body. A portion outside of the plate-like rigid or half-rigid reinforcing material adjacent to the thin impregnation layer gives a predetermined strength of reinforcement required for the cushion body. The thin impregnation layer does not have any influences on the strength of reinforcement of the cushion body.)

Such a technique has been used as a technique for reinforcing the cushion body.

In such a prior art technique, it is disadvantageously difficult to deform the rigid or half-rigid plate used as the reinforcing material. If a portion of the cushion body to be reinforced is not precisely formed in a predetermined shape, the cushion body is not formed in a predetermined shape corresponding to an outline of the cushion body, and thus, it is necessary to cut a part of the reinforcing material before covering the cushion body with the surface material, and reinforcing the cushion body costs time and care.

SUMMARY OF THE INVENTION

An object of the invention is to provide a cushion body of a seat cushion that can be easily reinforced in low cost. Another object of the invention is to provide a method for manufacturing such a cushion body. Still another object of the invention is to provide an apparatus for manufacturing such a cushion body.

The invention is a cushion body having a main part and a side part generally corresponding to a main part and a side part of a seat cushion.

The cushion body according to the invention comprises a foamed body generally corresponding to an outline of the cushion body and an air-permeable material fixed to the foamed body.

The foamed body is made of cold urethane foam. The air-permeable material is fixed to the foamed body by an impregnation layer formed in an overlapped portion of the foamed body and the air-permeable material. The impregnation layer reinforces a portion of the cushion body where the air-permeable material is fixed.

The thickness of the impregnation layer is thinner than that of the air-permeable material. A surface layer of a portion of the cushion body where the air-permeable material is fixed is formed of a non-impregnation layer outside the air-permeable material adjacent to the impregnation layer.

In addition, the impregnation layer has a thickness that can at least provide a predetermined strength of reinforcement for a portion of the cushion body where the air-permeable material is fixed.

Thus, the surface layer of a portion of the cushion body where the air-permeable material is fixed is formed of the non-impregnation layer outside the air-permeable material adjacent to the impregnation layer, and a portion of the cushion body where the air-permeable material is fixed is reinforced.

Preferably, a plurality of air-permeable materials is fixed to the side part of the foamed body, so that the side part of the cushion body can be reinforced.

A soft sponge sheet, a woven sheet or a non-woven sheet is used as the air-permeable material. Preferably, the sponge sheet is used as the air-permeable material, and slab urethane foam is used as the sponge sheet.

The above cushion body of a seat cushion is manufactured using a foaming apparatus according to the invention.

The foaming apparatus according to the invention comprises a molding device. The molding device comprises an upper mold and a lower mold. The upper mold has an inside corresponding to a back part of the cushion body. The lower mold has an inside corresponding to a main part and a side part of the cushion body. When the molding device is clamped, an inner space corresponding to an outline of the cushion body is formed inside the molding device. The lower mold has means for exhausting. The exhausting means preferably comprises a valve and a vent hole connected to the exterior through the valve. Alternatively, the exhausting means comprises a piston cylinder and a vent hole connected to the piston cylinder. When the piston cylinder is operated after the molding device is clamped, the pressure inside the molding device is reduced. Preferably, a plurality of vent holes is provided in a portion of the inside of the lower mold corresponding to the side part of the cushion body.

In the foaming apparatus according to the invention, not only the lower mold but also the upper mold has such an exhausting means. Preferably, one or more vent holes are provided in a portion of the inside of the upper mold corresponding to the back part of the cushion body.

The cushion body of the invention is manufactured as follows. The air-permeable material is positioned inside the molding device such that the vent hole of the foaming apparatus of the invention is covered with the air-permeable material. The valve is opened (or the piston cylinder is operated). The predetermined amount of the undiluted solution of cold urethane foam is injected in the molding device, and then, the molding device is clamped. The undiluted solution of cold urethane foam expands. The valve is closed (or The operation of the piston cylinder is stopped) at the time elapsed for a predetermined period after the undiluted solution is completely injected in the molding apparatus. The undiluted solution is still expanding at this time, and the complete foamed body is formed and a predetermined thickness of the impregnation layer is formed and the air-permeable material is fixed to the foamed body.

While the valve is opened (or the piston cylinder is operated), air and gas inside the molding device is exhausted through the air-permeable material and the vent hole. The undiluted solution of cold urethane foam expands, and bubbles are dispersed inside the expanded undiluted solution. The expanded undiluted solution reaches on the air-permeable material and then impregnates into the air-permeable material. The bubbles of the expanded undiluted solution are broken while the expanded undiluted solution impregnates into the air-permeable material. Thus, a high dense and hard impregnation layer is formed in the air-permeable material.

The thickness of the impregnation layer can be controlled adjusting the time to dose the valve (or adjusting the time to stop the operation of the piston cylinder). If the time to close the valve (or to stop the operation of the piston cylinder) is delayed, the thickness of the impregnation layer is increased.

The time to dose the valve (or to stop the operation of the piston cylinder) is selected between the time when the undiluted solution of cold urethane foam is completely injected in the molding device and the time when the maximum expansion rate of the undiluted solution of cold urethane foam is accomplished.

The following effects are conducted according to the invention. A cushion body of the invention can be manufactured by use of a simple method comprising the steps of positioning the air-permeable material inside the molding device having means for exhausting and stopping operation of the exhausting means at the time elapsed for a predetermined period after the undiluted solution of cold urethane foam is completely injected in the molding device. By use of such a simple method, a cushion body of the invention can be manufactured without generating defects such as a collapse and the like. By use of such a simple method, a cushion body of the invention can be easily reinforced in low cost by use of the air-permeable material.

DETAILED DESCRIPTION OF THE INVENTION

Figure 1:
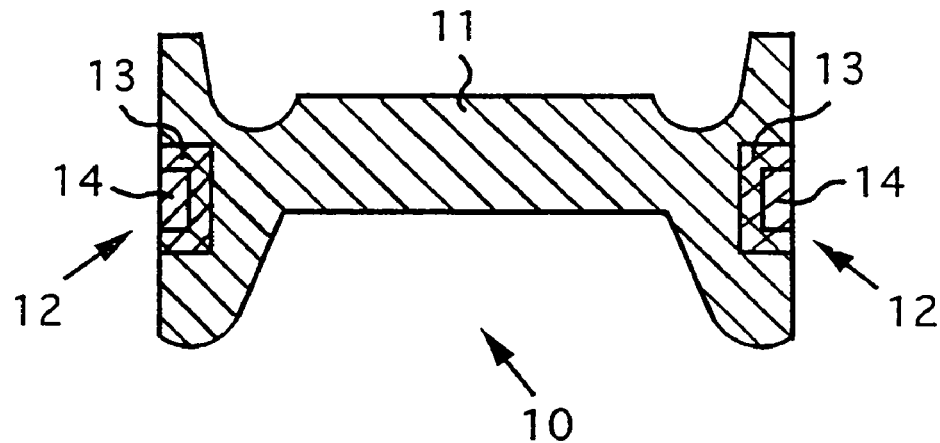
FIG. 1 is a cross-sectional view of a cushion body according to the invention.

<Cushion Body> As shown in FIG. 1, a cushion body 10 of a seat cushion (not shown) according to the invention has a main part and a side part generally corresponding to a main part and a side part of the seat cushion. The cushion body 10 comprises a foamed body 11 formed in a shape generally corresponding to an outline of the cushion body 10, an air-permeable material 12 fixed to the cushion body 10 and an impregnation layer 13 that serves to reinforce a portion of the cushion body 10 where the air-permeable material 12 is fixed to the foamed body 11. The foamed body 11 is made of cold urethane foam.

The impregnation layer 13 is a layer formed in an overlapped portion of the foamed body 11 and the air-permeable material 12. The impregnation layer 13 serves to fix the air-permeable material 12 to the foamed body 11 and to reinforce a portion of the cushion body 10 where the air-permeable material 12 is fixed to the foamed body 11.

The thickness of the impregnation layer 13 is thinner than that of the air-permeable material 12, so that a surface layer of a portion of the cushion body 10 where the air-permeable material 12 is fixed to the foamed body 11 is formed of a soft non-impregnation layer outside of the air-permeable material 12 adjacent to the impregnation layer 13. The thickness of the impregnation layer 13 has a thickness that can provide a predetermined strength to reinforce a portion of the cushion body 10 where the air-permeable material 12 is fixed to the foamed body 11, and thereby, a portion of the cushion body 10 where the air-permeable material 12 is fixed to the foamed body 11 is reinforced.

The air-permeable material as shown can be appropriately fixed to a portion of the cushion body to be reinforced. A shape and a size of the air-permeable material can be appropriately selected according to a shape and a size of a portion of the cushion body to be reinforced. Preferably, a plurality of air-permeable materials 12 is fixed to the side part of the foamed body 11, so that the side part of the cushion body 10 is reinforced.

As mentioned above, the foamed body 11 is made of cold urethane foam. The cold urethane foam can form a foamed body having a higher impact resiliency than a foamed body made of hot urethane foam typically used for manufacturing a cushion body of a seat cushion. In addition, the cure rate of cold urethane foam is higher than that of hot urethane foam, and thus, a foamed body can be formed in short time by use of cold urethane foam.

The air-permeable material 12 is selected from a group consisting of a soft sponge sheet, a woven sheet and a non-woven sheet. Preferably, a sponge sheet is used as the air-permeable material 12, and slab urethane foam is used as the sponge sheet.

Figure 2:
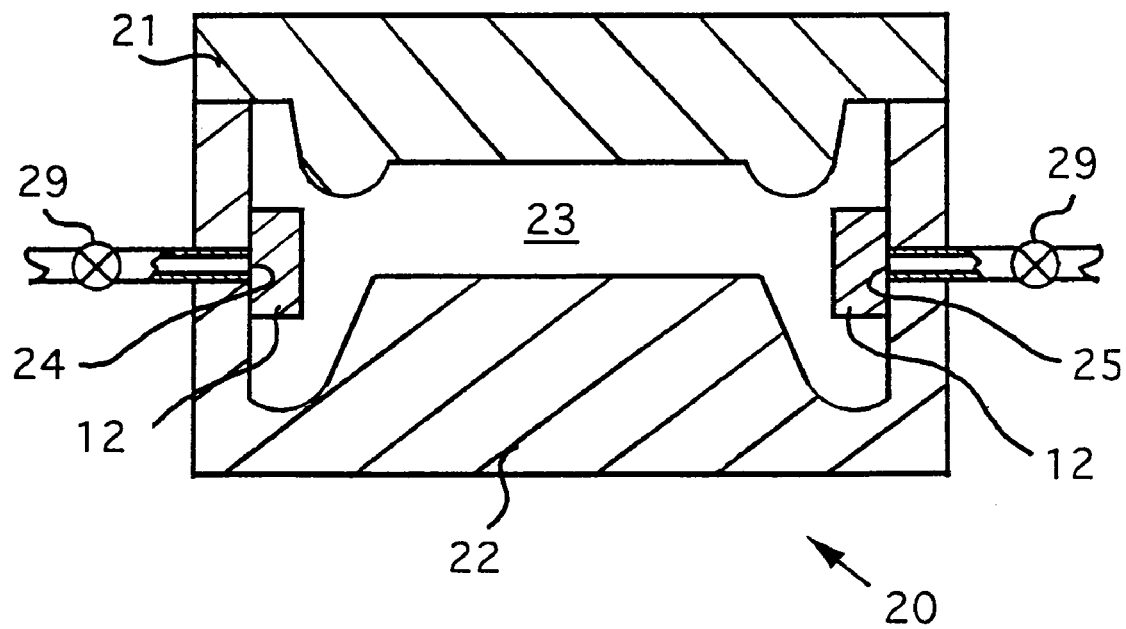
FIG. 2 is a cross-sectional view of a foaming apparatus for manufacturing the cushion body of FIG. 1 according to the invention, showing that a plurality of air-permeable materials is positioned inside the apparatus.

<Manufacturing Apparatus> The cushion body 10 of a seat cushion according to the invention shown in FIG. 1 is manufactured using a foaming apparatus 20 shown in FIG. 2. The foaming apparatus 20 comprises a molding device. The molding device comprises an upper mold 21 and a lower mold 22. The upper mold 21 has an inside corresponding to a back part of the cushion body 10. The lower mold 22 has an inside corresponding to the main part and the side part of the cushion body 10. The lower mold 22 is provided with means for exhausting. The exhausting means is provided in a portion of the inside of the lower mold 22 corresponding to the side part of the cushion body 10. When the molding device is damped, an inner space 23 corresponding to an outline of the cushion body 10 is formed inside the molding device. In this illustrative example, the exhausting means comprises a plurality of vent holes 24, 25 connected to the exterior through valves 29, 29, respectively. Alternatively, the exhausting means comprises the vent holes 24, 25 connected to piston cylinders (not shown). If the molding device is clamped and the piston cylinders are operated, the pressure inside the molding device is reduced.

Figure 3:
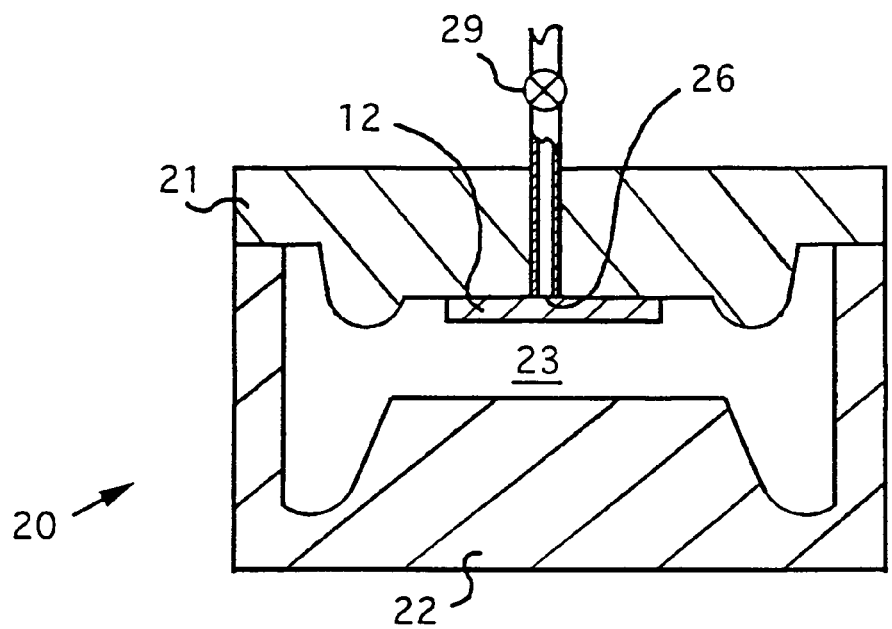
FIG. 3 is a cross-sectional view of an alternative example of a foaming apparatus for manufacturing the cushion body of FIG. 1 according to the invention, showing that a plurality of air-permeable materials is positioned inside the apparatus.
Figure 4:
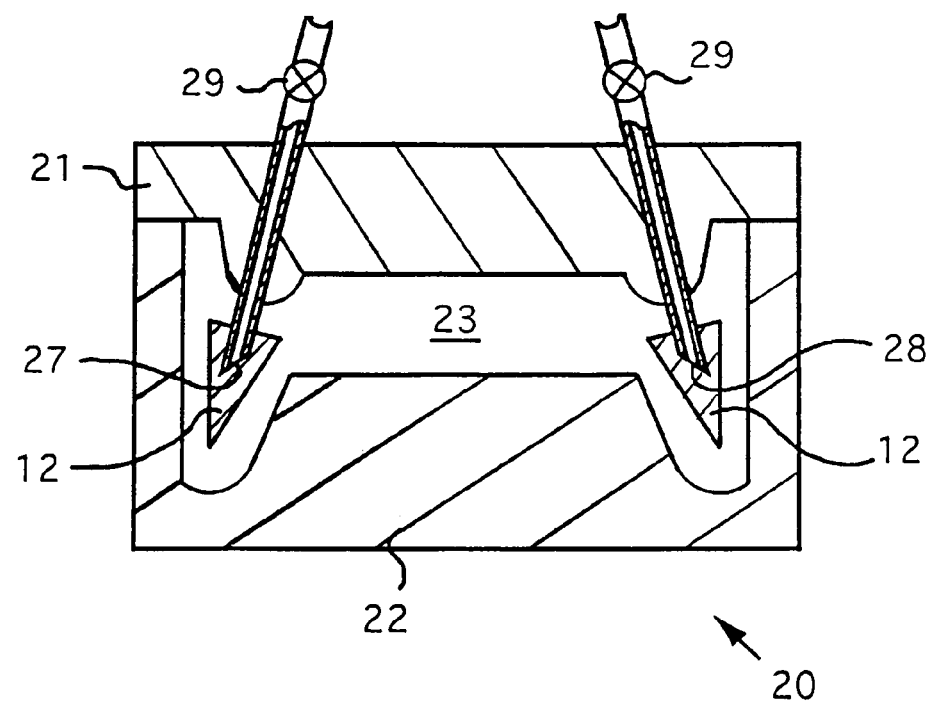
FIG. 4 is a cross-sectional view of another alternative example of a foaming apparatus for manufacturing the cushion body of FIG. 1 according to the invention, showing that a plurality of air-permeable materials is positioned inside the apparatus.

The foaming apparatus 20 is provided with two vent holes 24, 25 in the lower mold 22, in order to reinforce the side part of the cushion body 10. Alternatively, as shown in FIG. 4, the foaming apparatus 20 may be provided with two vent holes 27, 28 in the upper mold 21, and two thicker air-permeable materials 12 are struck into the respective tip portions of those vent holes 27, 28 so as to position those air-permeable materials inside the molding device. In addition, one or more vent holes connected to the exterior may be provided at positions selected from the positions of the vent holes shown in FIGS. 2 and 3. Instead of the exhausting means using the valve 29, the exhausting means using the piston cylinder connected to the vent hole may be used.

<Manufacturing Method> The cushion body 10 shown in FIG. 1 is manufactured using the foaming apparatus 20 shown in FIG. 2. The cushion body 10 is manufactured as follows. A plurality of air-permeable materials 12 is positioned inside the molding device such that the vent holes 24, 25 provided in the inside of the molding device are covered with those air-permeable materials 12, respectively. A predetermined amount of an undiluted solution of cold urethane foam is injected inside the molding device, and the molding device is then clamped. This undiluted solution of cold urethane foam expands to form the foamed body 11 and a predetermined thickness of the impregnation layer 13 so that those air-permeable materials 13 are fixed to the foamed body 11, respectively. The undiluted solution of cold urethane foam expands and impregnates into the air-permeable material 13, and thereby, the impregnation layer 13 is formed.

The thickness of the impregnation layer 13 can be controlled adjusting the diameter of the valve connected to the vent hole of the molding device or adjusting the time to close the valve after the undiluted solution of cold urethane foam is completely injected in the molding device. As the valve diameter increases, the thickness of the impregnation layer 13 increases. The valve closing time is delayed, the thickness of the impregnation layer 13 increases. As the thickness of the impregnation layer 13 is increased, the higher strength of reinforcement of the cushion body 10 is given. Thus, the strength of reinforcement of the cushion body 10 can be controlled adjusting the valve diameter and/or adjusting the valve closing time after the undiluted solution of cold urethane foam is completely injected in the molding device.

Preferably, a plurality of air-permeable material 12 is positioned inside the molding device so as to cover the vent holes provided in the lower mold 22 of the foaming apparatus 20. Thereby, those air-permeable materials 12 are fixed to portions of the side of the foamed body 11, so that the side of the cushion body 10 is reinforced.

The air-permeable material 12 is fixed to the foamed body 10 so as to form the non-impregnation layer 14 in an outer portion of the air-permeable material 12 that contacts with the vent hole 24, 25 of the upper mold 21. Thus, gas produced during the foaming is exhausted through the vent hole 24, 25, and the expanded undiluted solution does not flow out through the vent hole 24, 25 so that a mushroom-shaped foam formed of the expanded undiluted solution is not produced in the vent hole 24, 25. This matter is occurred in the foaming apparatus 20 shown in FIGS. 3 and 4.

<Thickness Control of Impregnation Layer> As mentioned above, the thickness of the impregnation layer 13 can be controlled adjusting the valve diameter and/or adjusting the time to close the valve after the undiluted solution of cold urethane foam is completely injected in the molding device.

Gas produced during the foaming is exhausted through the vent hole and the valve. As the diameter of the valve connected to the vent hole of the molding device increases, the exhaustion of gas is improved so as to impregnate the undiluted solution of cold urethane into the air-permeable material 12 in short time. Meanwhile, as the valve diameter decreases, the exhaustion of gas is restrained so as to impregnate the undiluted solution of cold urethane into the air-permeable material 12 in long time. Thus, the thickness control of the impregnation layer 12 can be appropriately done adjusting the valve diameter.

We now consider the time to close the valve after the undiluted solution of cold urethane foam is completely injected in the molding device.

Figure 5:
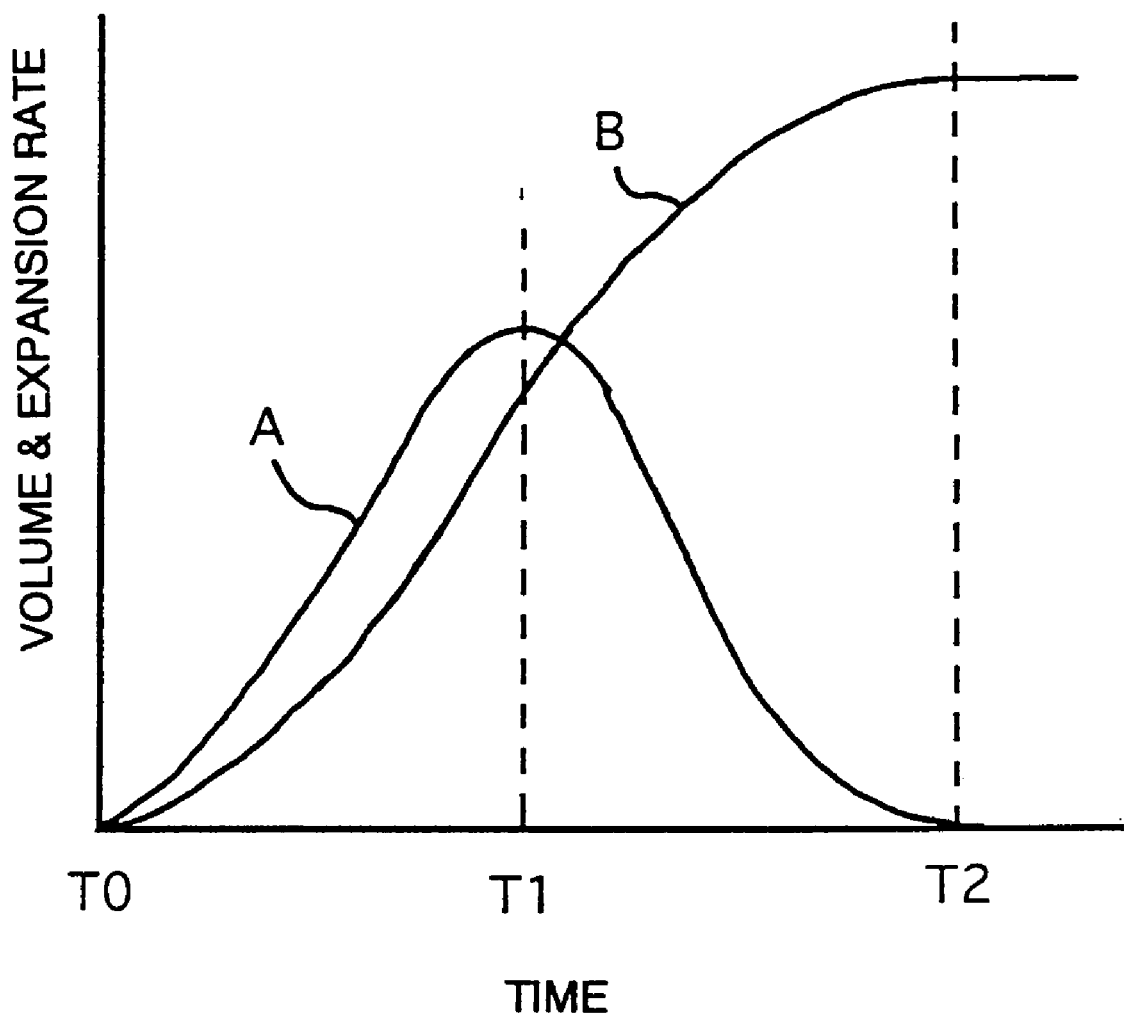
FIG. 5 is a graph showing rate of change in expansion and volume.

FIG. 5 is a graph showing rate of change in expansion and volume. The rate of change in volume is defined as a volume of the foamed or expanded undiluted solution of cold urethane foam. In the graph, a curve indicated by numeral "A" is rate of change in expansion, and a curve indicated by numeral "B" is rate of change in volume. Numeral "T0" shows time when the foaming is started, and numeral "T1" is time when the maximum rate of change in expansion is obtained. Numeral "T2" is time when the foaming is terminated.

As shown, the undiluted solution of cold urethane foam exhibits a high fluidity from T0 to T1. Between T0 and T1, the foaming or expanding pressure of the undiluted solution of cold urethane foam is high and the impregnation speed of the undiluted solution of cold urethane foam into the air-permeable material is high. That is, between T0 and T1, form of the impregnation layer in the air-permeable material is improved.

If the valve is continuously opened and time exceeds T1, both the fluidity of the undiluted solution of cold urethane foam and the impregnation speed of the undiluted solution are decreased so that the impregnation layer incompletely formed in the air-permeable material is pressed to the vent hole (the vent hole is at lower pressure) by the expanding pressure of the undiluted solution of cold urethane foam, and thereby, the impregnation layer is deformed. If the valve is continuously opened until T2, a portion of the foamed body around the impregnation layer may be collapsed.

Thus, while the thickness of the impregnation layer increases as the valve dosing time is delayed, it is desirable to dose the valve between T0 and T.

EXAMPLES

A cushion body of a seat cushion is manufactured according to the invention.

Cold Urethane Foam: The property of an undiluted solution of cold urethane foam used is that the expansion is completely terminated in 70 seconds and the density of foamed body becomes 50 kg/m$^3$.

Air-permeable Material: Slab urethane foam is used as an air-permeable material. Two air-permeable materials are used to cover both left and right sides of a cushion body. The thickness of each air-permeable material is 30 mm.

Foaming Apparatus: A foaming apparatus as shown in FIG. 2 is used and comprises a molding device. The molding device comprises an upper mold and a lower mold. The lower mold is provided with two vent holes (as indicated numerals 25 of FIG. 2), and each vent hole is connected to the exterior through a valve. The air-permeable material is positioned inside the molding device such that the vent hole is covered with the air-permeable material. Examples 1–3 mentioned below are carried out by use of different valve diameters. In Example 1, the valve diameter of each valve is 1ø. In Example 2, the valve diameter of each, valve is 2ø. In Example 3, the valve diameter of each valve is 3ø.

Example 1

A cushion body of Example 1 is manufactured as follows. The valves (each valve diameter is 1ø) connected to the vent holes of the lower mold are opened, and each air-permeable material is positioned so as to cover each vent hole. The undiluted solution of cold urethane foam (1040 g) is injected, and then, the molding device is clamped. The undiluted solution expands and impregnates into the air-permeable materials. Then, a foamed body generally corresponding to an outline of the cushion body is formed, and the air-permeable materials are fixed to the foamed body so as to reinforce the side part of the cushion body. The valves are opened for 25 seconds after the undiluted solution of cold urethane foam is completely injected in the molding device, and the valve are then closed. In Example 1, a desired outline of the cushion body without collapsing is manufactured. The thickness of the impregnation layer of the cushion body of Example 1 is 4 mm (see Test Example 1 of Table 1).

Example 2

A cushion body of Example 2 is manufactured as follows. The valves (each valve diameter is 2ø) connected to the vent holes of the lower mold are opened, and each air-permeable material is positioned so as to cover each vent hole. The undiluted solution of cold urethane foam (1040 g) is injected, and then, the molding device is clamped. The undiluted solution expands and impregnates into the air-permeable materials. Then, a foamed body generally corresponding to an outline of the cushion body is formed, and the air-permeable materials are fixed to the foamed body so as to reinforce the side part of the cushion body. The valves are opened for 25 seconds after the undiluted solution of cold urethane foam is completely injected in the molding device, and the valve are then dosed. In Example 2, a desired outline of the cushion body without collapsing is manufactured as well as Example 1. The thickness of the impregnation layer of the cushion body of Example 2 is 9 mm (see Test Example 2 of Table 1).

Example 3

A cushion body of Example 3 is manufactured as follows. The valves (each valve diameter is 3ø) connected to the vent holes of the lower mold are opened, and each air-permeable material is positioned so as to cover each vent hole. The undiluted solution of cold urethane foam (1040 g) is injected, and then, the molding device is damped. The undiluted solution expands and impregnates into the air-permeable materials. Then, a foamed body generally corresponding to an outline of the cushion body is formed, and the air-permeable materials are fixed to the foamed body so as to reinforce the side part of the cushion body. The valves are opened for 25 seconds after the undiluted solution of cold urethane foam is completely injected in the molding device, and the valve are then closed. In Example 3, a desired outline of the cushion body without collapsing is manufactured as well as Example 1. The thickness of the impregnation layer of the cushion body of Example 3 is 14 mm (see Test Example 3 of Table 1).

<Impregnation Thickness Control Test> The thickness control test of an impregnation layer to be formed in the air-permeable material is carried out.

The test is carried out by use of different valve diameters (1ø, 2ø and 3ø) with different valve dosing time (25, 30, 35, 40, 45 and 50 seconds).

Cold Urethane Foam:

The property of an undiluted solution of cold urethane foam used is that the expansion is completely terminated in 70 seconds and the density of foamed body becomes 50 kg/m$^3$ (the same as Examples 1–3).

Air-permeable Material: Slab urethane foam is used as an air-permeable material. Two air-permeable materials are used to cover both left and right sides of a cushion body. The thickness of each air-permeable material is 30 mm (the same as Examples 1–3).

Foaming Apparatus: A foaming apparatus as shown in FIG. 2 is used and comprises a molding device (the same as Examples 1–3). The molding device comprises an upper mold and a lower mold. The lower mold is provided with two vent holes (as indicated numerals 25 of FIG. 2), and each vent hole is connected to the exterior through a valve. The air-permeable material is positioned inside the molding device such that the vent holes are covered with the air-permeable materials, respectively. Test Examples 1–3 mentioned below are carried out by use of different valve diameters. In Test Example 1, the valve diameter of each valve is 1ø. In Test Example 2, the valve diameter of each valve is 2ø. In Test Example 3, the valve diameter of each valve is 3ø.

Test Example 1

A cushion body of Test Example 1 is manufactured as follows. The valves (each valve diameter is 1ø) connected to the vent holes of the lower mold are opened, and each air-permeable material is positioned so as to cover each vent hole. The undiluted solution of cold urethane foam (1040 g) is injected, and then, the molding device is damped. The undiluted solution expands and impregnates into the air-permeable materials. Then, a foamed body generally corresponding to an outline of the cushion body is formed, and the air-permeable materials are fixed to the foamed body so as to reinforce the side part of the cushion body. The valves are opened for 25 seconds after the undiluted solution of cold urethane foam is completely injected in the molding device, and the valve are then closed (as same as Example 1). In Test Example 1, the other cushion bodies are also manufactured by opening the valves for 30, 35, 40, 45 and 50 seconds after the undiluted solution of cold urethane foam is completely injected in the molding device, and then dosing the valves.

In each of the cushion bodies manufactured by opening the valves for 30, 35, 40 and 45 seconds after the undiluted solution of cold urethane foam, a desired outline of the cushion body without collapsing is manufactured. In the cushion body manufactured by opening the valves for 50 seconds after the undiluted solution of cold urethane foam, the surface (non-impregnation layer) of a portion of the cushion body where the air-permeable material is fixed swells up, and the cushion body is deformed. The thickness of the impregnation layer of each of those cushion bodies of Test Example 1 is shown in Table 1.

Test Example 2

A cushion body of Test Example 2 is manufactured as follows. The valves (each valve diameter is 2ø) connected to the vent holes of the lower mold are opened, and each air-permeable material is positioned so as to cover each vent hole. The undiluted solution of cold urethane foam (1040 g) is injected, and then, the molding device is clamped. The undiluted solution expands and impregnates into the air-permeable materials. Then, a foamed body generally corresponding to an outline of the cushion body is formed, and the air-permeable materials are fixed to the foamed body so as to reinforce the side part of the cushion body. The valves are opened for 25 seconds after the undiluted solution of cold urethane foam is completely injected in the molding device, and the valve are then closed (as same as Example 2). In Test Example 2, the other cushion bodies are also manufactured by opening the valves for 30, 35, 40 and 45 seconds after the undiluted solution of cold urethane foam is completely injected in the molding device, and then closing the valves.

In each of the cushion bodies manufactured by opening the valves for 30, 35 and 40 seconds after the undiluted solution of cold urethane foam, a desired outline of the cushion body without collapsing is manufactured. In the cushion body manufactured by opening the valves for 45 seconds after the undiluted solution of cold urethane foam, the surface (non-impregnation layer) of a portion of the cushion body where the air-permeable material is fixed swells up, and the cushion body is deformed. The thickness of the impregnation layer of each of those cushion bodies of Test Example 2 is shown in Table 1.

Test Example 3

A cushion body of Test Example 3 is manufactured as follows. The valves (each valve diameter is 3ø) connected to the vent holes of the lower mold are opened, and each air-permeable material is positioned so as to cover each vent hole. The undiluted solution of cold urethane foam (1040 g) is injected, and then, the molding device is damped. The undiluted solution expands and impregnates into the air-permeable materials. Then, a foamed body generally corresponding to an outline of the cushion body is formed, and the air-permeable materials are fixed to the foamed body so as to reinforce the side part of the cushion body. The valves are opened for 25 seconds after the undiluted solution of cold urethane foam is completely injected in the molding device, and the valve are then dosed (as same as Example 3). In Test Example 3, the other cushion bodies are also manufactured by opening the valves for 30, 35 and 40 seconds after the undiluted solution of cold urethane foam is completely injected in the molding device, and then dosing the valves.

In each of the cushion bodies manufactured by opening the valves for 30 and 35 seconds after the undiluted solution of cold urethane foam, a desired outline of the cushion body without collapsing is manufactured. In the cushion body manufactured by opening the valves for 40 seconds after the undiluted solution of cold urethane foam, the surface (non-impregnation layer) of a portion of the cushion body where the air-permeable material is fixed swells up, and the cushion body is deformed. The thickness of the impregnation layer of each of those cushion bodies of Test Example 3 is shown in Table 1.

<Results> Results of Test Examples 1–3 are shown in Table 1.

TABLE 1

| | Thickness (mm) of Impregnation Layer | | |
|---|---|---|---|
| Valve dosing time | Test Example 1 | Test Example 2 | Test Example 3 |
| 25 seconds later | 4 | 9 | 14 |
| 30 seconds later | 7 | 14 | 21 |
| 35 seconds later | 10 | 18 | 27 |
| 40 seconds later | 12 | 22 | deformed |
| 45 seconds later | 14 | deformed | |
| 50 seconds later | deformed | | |

As shown in Table 1, as the valve diameter increases, the thickness of the impregnation layer increases. As the valve dosing time after the undiluted solution of cold urethane foam is completely injected is delayed, the thickness of the impregnation layer is increased. That is, as shown in Table 1, the thickness of the impregnation layer can be controlled adjusting the valve diameter and/or adjusting the valve closing time after the undiluted solution of cold urethane foam is completely injected. As mentioned, the thickness of the impregnation layer can be appropriately controlled, and as a result, the strength of a portion of the cushion body where the air-permeable material is fixed can be appropriately adjusted.

I claim:

1. A method for manufacturing a cushion body using a foaming apparatus,
    said cushion body having a main part and a side part generally corresponding to a main part and a side part of a seat cushion,
    said cushion body comprising:
    a foamed body made of cold urethane foam, a shape of said foamed body being generally corresponding to an outline of said cushion body;
    an air permeable material fixed to said foamed body; and
    an impregnation layer that is a layer formed in an overlapped portion of said foamed body and said air-permeable material, said air-permeable material being fixed to said foamed body by this layer, the thickness of said impregnation layer being thinner than that of said air-permeable material so that a surface layer of a portion of said cushion body where said air-permeable material is fixed to said foamed body is formed of a non-impregnation part outside of said air-permeable material adjacent to said impregnation layer, the thickness of said impregnation layer having a thickness that can at least provide a predetermined strength of reinforcement to the portion of said cushion body where said air-permeable material is fixed to said foamed body, so that the portion of said cushion body where said air-permeable material is fixed to said foamed body is reinforced, said foaming apparatus comprising a molding device, said molding device comprising:

an upper mold having an inside corresponding to a back part of said cushion body; and a lower mold having an inside corresponding to said main part and said side part of said cushion body, wherein an inner space corresponding to an outline of said cushion body is formed inside said molding device, when said molding device is clamped, said upper mold having means for exhausting comprising a valve and a vent hole connected to the exterior through said valve, said method comprising the steps of, positioning said air-permeable material inside said molding device such that said vent hole is covered with said air-permeable material;

opening said valve, and damping said molding device after injecting an undiluted solution of cold urethane foam inside said molding device, said undiluted solution being expanded; and closing said valve at the time elapsed for a predetermined time period after the undiluted solution is completely injected inside said molding device, wherein the undiluted solution of cold urethane foam is expanding at said time so that said foamed body is formed and a predetermined thickness of said impregnation layer is formed to fix said air-permeable material to said foamed body, said time being between the time when the undiluted solution of cold urethane foam is completely injected inside said molding device and the time when the expansion rate of the undiluted solution of cold urethane foam is maximum.

2. A method for manufacturing a cushion body using a foaming apparatus, said cushion body having a main part and a side part generally corresponding to a main part and a side part of a seat cushion, said cushion body comprising:

a foamed body made of cold urethane foam, a shape of said foamed body being generally corresponding to an outline of said cushion body;

an air-permeable material fixed to said foamed body; and an impregnation layer that is a layer formed in an overlapped portion of said foamed body and said air-permeable material, said air-permeable material being fixed to said foamed body by this layer, the thickness of said impregnation layer being thinner than that of said air-permeable material so that a surface layer of a portion of said cushion body where said air-permeable material is fixed to said foamed body is formed of a non-impregnation part outside of said air-permeable material adjacent to said impregnation layer, the thickness of said impregnation layer having a thickness that can at least provide a predetermined strength of reinforcement to the portion of said cushion body where said air-permeable material is fixed to said foamed body, so that the portion of said cushion body where said air-permeable material is fixed to said foamed body is reinforced, said foaming apparatus comprising a molding device, said molding device comprising:

an upper mold having an inside corresponding to a back part of said cushion body; and a lower mold having an inside corresponding to said main part and said side part of said cushion body, wherein an inner space corresponding to an outline of said cushion body is formed inside said molding device, when said molding device is clamped, said upper mold having means for exhausting comprising a piston cylinder and a vent hole connected to said piston cylinder, wherein the pressure inside said molding device is reduced, when said piston cylinder is operated, said method comprising the steps of:

positioning said air-permeable material inside said molding device of said apparatus such that said vent hole is covered with said air-permeable material;

operating said piston cylinder, and damping said molding device after injecting an undiluted solution of cold urethane foam inside said molding device, said undiluted solution being expanded; and stopping the operation of said piston cylinder at the time elapsed for a predetermined time period after the undiluted solution is completely injected inside said molding device, wherein the undiluted solution of cold urethane foam is expanding at said time so that said foamed body is formed and a predetermined thickness of said impregnation layer is formed to fix said air-permeable material to said foamed body, said time being between the time when the undiluted solution of cold urethane foam is completely injected inside said molding device and the time when the expansion rate of the undiluted solution of cold urethane foam is maximum.

* * * * *

UNITED STATES PATENT AND TRADEMARK OFFICE
CERTIFICATE OF CORRECTION

| | |
|---|---|
| PATENT NO. | : 7,056,457 B2 |
| APPLICATION NO. | : 10/471187 |
| DATED | : June 6, 2006 |
| INVENTOR(S) | : Yasumasa Senoo |

It is certified that error appears in the above-identified patent and that said Letters Patent is hereby corrected as shown below:

Claim 2, column 12, line 37, please delete the word "damping" and insert the word --clamping--.

Signed and Sealed this

Seventh Day of November, 2006

JON W. DUDAS
*Director of the United States Patent and Trademark Office*